United States Patent
Engelhardt

[11] Patent Number: 6,092,460
[45] Date of Patent: Jul. 25, 2000

[54] CANNED FOOD RATCHET-LOCKING STRAINER DEVICE

[76] Inventor: Jeffrey Engelhardt, 587 Sergeantsville Rd., Flemington, N.J. 08822

[21] Appl. No.: 09/353,453

[22] Filed: Jul. 14, 1999

[51] Int. Cl.[7] .............. A47J 19/06; B30B 7/00; B30B 9/04; B30B 9/06
[52] U.S. Cl. .............. 99/495; 99/506; 100/110; 100/116; 100/213; 100/234; D7/666; D7/687
[58] Field of Search .............. 99/495, 506–508, 99/644; 100/37, 110, 233, 234, 132, 134, 135, 266, 295; 141/121–124; 414/419; 294/16, 118; D7/666, 686, 687, 619, 668; 210/464, 768, 470

[56] References Cited

U.S. PATENT DOCUMENTS

| | | | |
|---|---|---|---|
| D. 244,118 | 4/1977 | Dick | D7/105 |
| D. 311,116 | 10/1990 | Pentland | D7/666 |
| D. 342,649 | 12/1993 | Miller et al. | D7/666 |
| D. 358,304 | 5/1995 | Hoddinott . | |
| D. 366,189 | 1/1996 | Bidlack | D7/666 |
| 3,995,544 | 12/1976 | Farley | 100/116 |
| 4,355,574 | 10/1982 | Bond et al. | 100/234 |
| 4,860,647 | 8/1989 | Kersiake | 100/234 |
| 5,272,968 | 12/1993 | Keville et al. | 100/110 |
| 5,272,969 | 12/1993 | McDonald | 100/110 |
| 5,289,762 | 3/1994 | Phillips | 99/495 |
| 5,295,432 | 3/1994 | Keville et al. | 100/110 |
| 5,320,031 | 6/1994 | Whitney | 99/458 X |
| 5,363,759 | 11/1994 | D'Ambrosio | 100/110 |
| 5,396,838 | 3/1995 | Casapulla | 110/116 |
| 5,419,245 | 5/1995 | Short | 100/125 |
| 5,501,144 | 3/1996 | Bryson | 100/116 |
| 5,590,590 | 1/1997 | Zammit | 99/495 |
| 5,706,721 | 1/1998 | Homes | 99/495 |
| 5,826,502 | 10/1998 | Wade | 100/234 |
| 5,902,481 | 5/1999 | Schwietert | 99/508 X |

*Primary Examiner*—Timothy Simone
*Attorney, Agent, or Firm*—Kenneth P. Glynn, Esq.

[57] ABSTRACT

The present invention is directed to a device for removing liquid from solid canned goods such as tuna. More specifically, the present invention is a hand held strainer device which operates in scissor-like fashion and includes opposing, hinged members with one having a can support and the other having a free floating strainer. The device further includes a quick-release, thumb activated ratchet-locking and engaging mechanism.

10 Claims, 2 Drawing Sheets

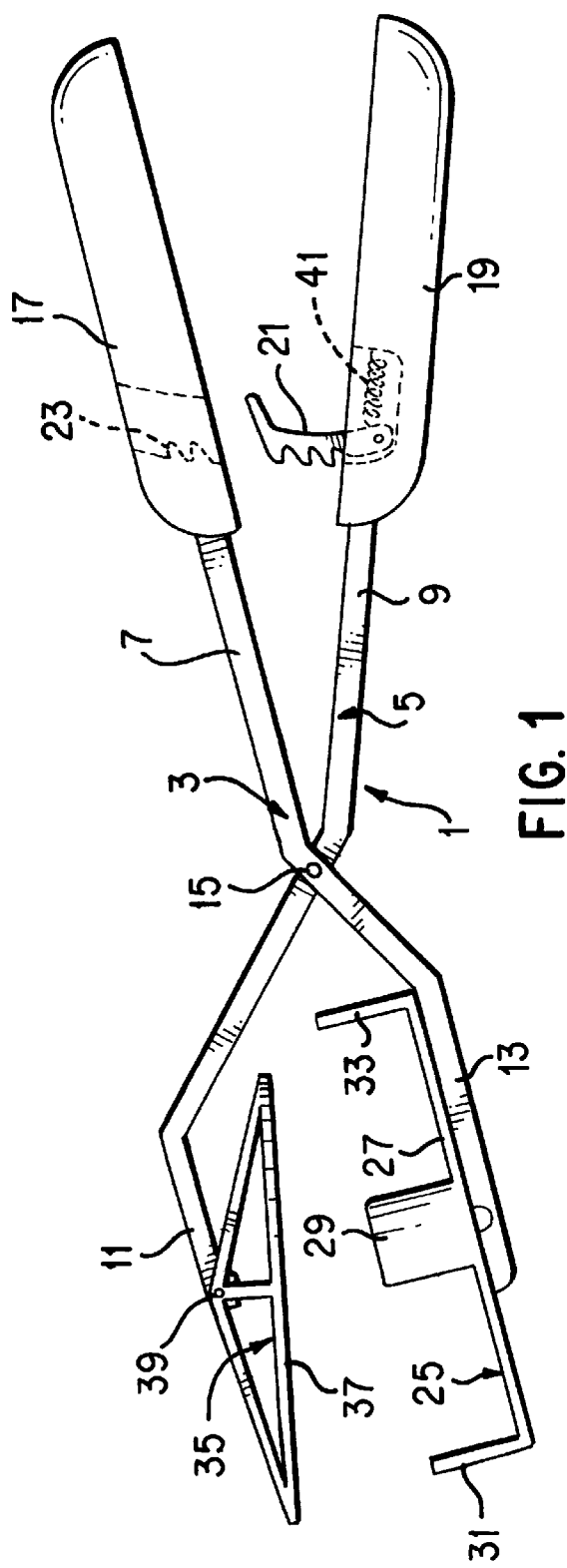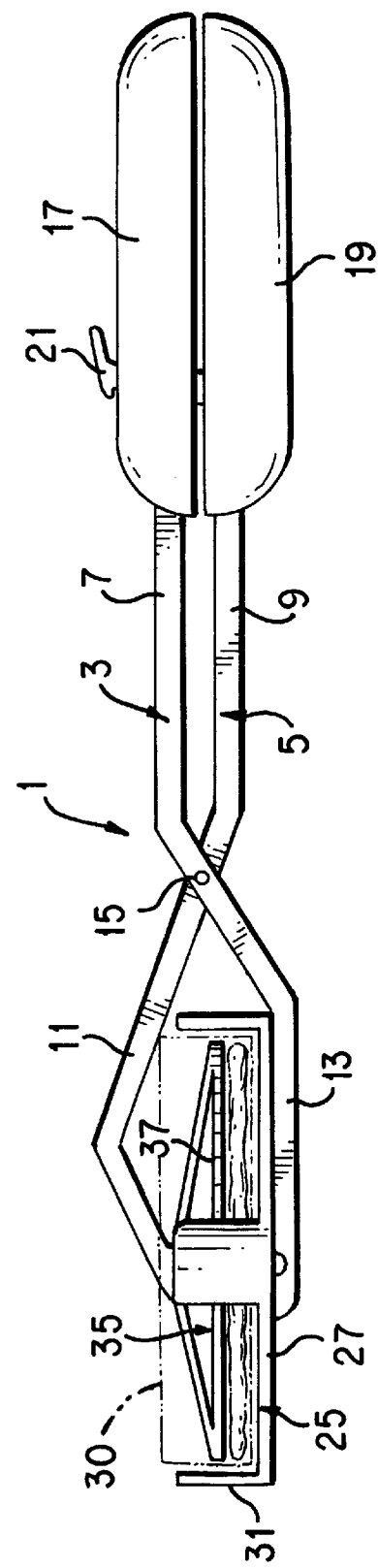

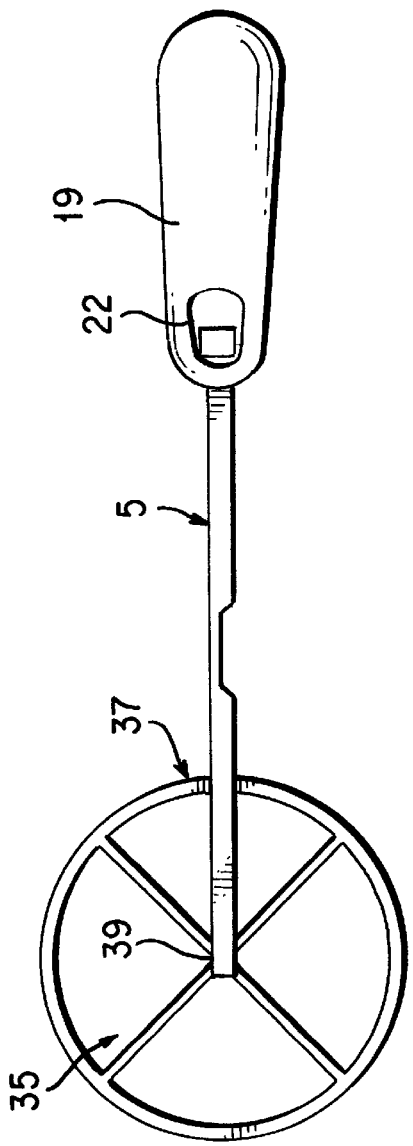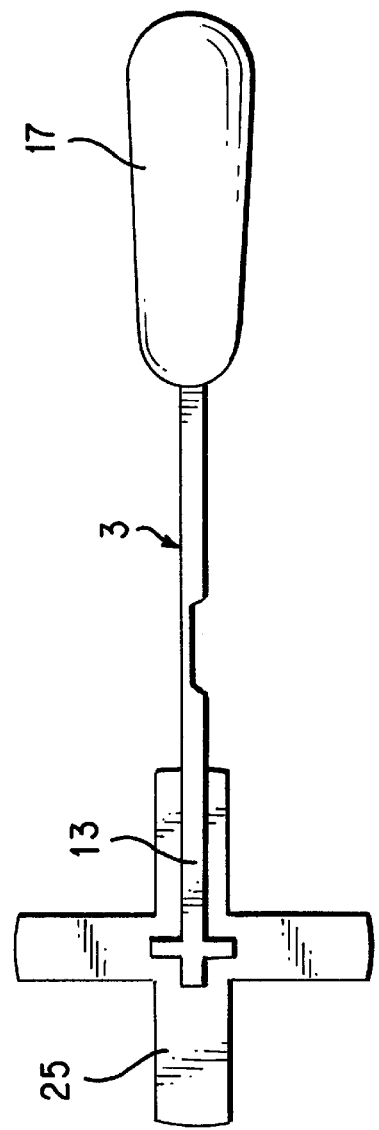

CANNED FOOD RATCHET-LOCKING STRAINER DEVICE

BACKGROUND OF THE INVENTION

1. Field of the Invention

The present invention relates to separating liquids from solids contained in a can or similar container. More specifically, the present invention is a strainer device for pressing liquid out of solids in a manually operated fashion.

2. Information Disclosure Statement

The following patents are representative of the prior art relating to the field of the present invention:

U.S. Design Pat. No. Des. 244,118 illustrates a retaining tool for a cut can lid.

U.S. Design Pat. No. Des. 311,116 illustrates a tuna can squeezer having a scissor-like fixed angle squeezer plate.

U.S. Design Pat. No. Des. 342,649 illustrates a press for canned goods.

U.S. Design Pat. No. Des. 358,304 illustrates a hinged can squeezer.

U.S. Design Pat. No. 366,189 illustrates a draining press for canned goods.

U.S. Pat. No. 3,995,544 to D. Gray Farley describes a utensil for the separation of liquid from subdivided solid comestibles, typically, for the separation of oil and liquid from canned meats such as tuna and the like. The device comprises a generally cup-shaped member having a cylindrical wall conforming to the internal diameter of a standard can size and an end, circular wall which is perforated to provide permeability to liquid while blocking passage of subdivided solid comestibles. The side walls distally support tab means which project radially outwardly from the side walls to provide for grasping of the press whereby the press can be inserted into a can, compressed against the contents therein and then rotated into an inverted position to permit unimpeded drainage from the can.

U.S Pat. No. 4,355,574 to James M. Bond and Robert P. Dail, describes a liquid-expressing tong-like implement for removing liquid from a solid can of food product containing solid food product immersed in liquid formed as a pair of scissor-like elongated arms pivoted together and having a finger at handle-forming rear end portions thereof and front end portions at the ends opposite said finger loop formations providing loop-shaped jaw formations. One of the jaw formation loops has a generally straight rod-like front leg portion extending transversely of its associated elongated arm, and a flat platen member sized to fit into an opened food product can to exert pressing forces onto the solid food product is pivotally coupled to the rod-like leg portion for pivotal movement about that transversely arranged leg portion. The other of the jaw formation loops defines a flat portion to engage the bottom of the opened can.

U.S. Pat. No. 4,860,647 to James L. Kerslake, relates to the present invention to an improved can draining implement including two handles privotably attached together. One handle has a can supporting plate which faces a plunger on the other handle. The plunger has an angled face designed to cause liquid being drained from the can to flow to one side. Furthermore, the plunger has embedded therein a magnet designed to hold the lid of the can after draining had been accomplished.

U.S. Pat. No. 5,272,968 to Patricia M. Keville and Thomas J. Murphey, Jr., describes a hand utensil for draining liquid from canned foods, or for removing can lids after opening and of the type having a base with a grip which contains a pass through hole containing a spring in which the T shaped handle passes through when compressed causing the magnetic plate to place pressure on a lid of an opened can, and when uncompressed the T shaped handle will return to its original position causing the can lid to be removed from the can attached to the magnetic plate. The utensil is made of an inflexible material so that it is strong enough to safely provide the required pressure.

U.S. Pat. No. 5,272,969 to Brian McDonald, describes a canned material compressing and liquid extracting device including a pair of elongated lower and upper handles and a hinge pivotally attaching adjacent respective one ends of the handles together permitting the handles to be moved toward and away from each other between a closed position and an opened position. The device also includes a land portion mounted on the lower handle for seating a container which has an open top end and encloses a material to be compressed and a piston member pivotally mounted to the upper handle for insertion into the open top end of the container so as to overlie a severed lid of the container for applying a force on the severed lid sufficient to compress the material in the container and extract liquid therefrom as the upper and lower handles are moved relative to one another from the opened position toward the closed position. The device further includes a linkage extending between and connected with the piston member and the one end of the lower handle to cause pivoting of piston relative to the upper handle in a direction opposite to the direction of pivoting of the upper handle relative to the lower handle as the handles are moved toward and away from one another so as to maintain the piston in a predetermined alignment with the container for facilitating uniform compressing of the material in the container.

U.S. Pat. No. 5,501,144 to Keith Bryson describes a hand held press used to remove the liquid packing fluids in a can of food by biasing the lid of the can against the contents of the can. The press includes an upper pressing element and a lower pressing element. The upper pressing element has a perforated region that acts as a strainer. The perforated region is advanced against the lid and into the can, wherein displaced packing fluids are collected within a receiving area defined within the perforated region. A pour spout then allows the collected fluids to be removed in a controlled manner. The lower pressing element retains the can in a predetermined orientation as the can is being pressed. Accordingly, the angle at which the displaced fluids will pour is controlled by the manipulation of the press and the can of food held firmly within the press.

U.S. Pat. No. 5,590,590 to Edward Zammit describes an implement for separating the liquid medium from the solid contents of canned foodstuffs, e.g., canned tuna fish, having two arms pivotally connected by a hinge, e.g., a pivot pin, one arm ending in a compression plate the other ending in a can receptacle, one or both arms being bent to allow substantial alignment of the compression plate and can receptacle, is described. The opposite ends of both arms are handles; and the compression plate is sized so as to fit into the can containing foodstuffs and allow liquid to escape therefrom when the contents are compressed. The thickness of the compression plate is also sized so that a portion protrudes from the top of the can after the contents thereof have been compressed, so that it can be used to strike a solid surface, generating a further compressive force.

U.S. Pat. No. 5,706,721 to Hamilton E. Homes describes a food can drainer for a can containing a solid foodstuff and packing fluid is foraminous sheet sized to fit an end of the can when the can is open at that end, with holes in the sheet sized to retain the foodstuff in the can, yet allow flow of the packing fluid when the can is tipped to decant the fluid. For typical cylindrical cans such as tuna or salmon, the drainer is a perforated disc sized to fit snugly in the can so that, when the can is inverted, packing fluid flows out of the holes in the disc and manual pressure can be exerted to squeeze out excess fluid. The holes are positioned so that the packing fluid forms a stream in the approximate center of the drainer. The drainer can be installed in the can during or after canning.

U.S. Pat. No. 5,826,502 to Bruce B. Wade describes a press-like device, for the forcing of canning liquid from solid food in a can of a type having a lid arranged to be severed to effect the opening of the can, including a first member having a convex part and a concave part, a lower surface of the convex part including a gripping unit and an aperture at a free end of the concave part, the first member including a slot at a region of transition between the convex and concave parts. The device further includes a lid engagement element, the same inclusive of a magnet, the lid engagement element dependent from a free end of the concave part of the member. The device further includes a second member having a concave part and a convex part, the second member pivotally secured to the first member at a fulcrum point passing through the slot of the first member and passing through a region of transition within the second member between the concave and convex parts thereof, the convex part including, at a free end, elements for locking within the aperture of the free end of the convex part at selectable distances between the respective free ends of the respective parts of the first and second members. The device yet further includes a can base element integrally dependent from a free end of the concave part of the second member of the device, the base element disposed oppositely to the lid engagement element.

Notwithstanding the prior art, the present invention is neither taught nor rendered obvious thereby.

SUMMARY OF THE INVENTION

The present invention relates to a portable, hand held strainer device for separating liquid from solids from canned food or similarly packaged food. It includes an upper member and a lower member, each of which have a handle end and an operating end. (The two members are defined as an upper member and a lower member based on the relative positions of the two members of their operating ends when in use.) The two members are pivotally connected to one another in scissor-like fashion. The lower member is adapted at its operating end to support a can, i.e., it includes a can support connected thereto. This can support includes a support base which has a substantially flat surface which faces the operating end of the upper member.

BRIEF DESCRIPTION OF THE DRAWINGS

The present invention should be more fully understood when the specification herein is taken in conjunction with the drawings appended hereto wherein:

FIGS. 1 and 2 show a side open view and a side closed view of one embodiment of the present invention ratchet-locking manual strainer device and FIGS. 3 and 4 show a top view of the upper member thereof and a bottom view of the lower member thereof respectively.

DETAILED DESCRIPTION OF THE PRESENT INVENTION

The present invention is directed to a hand-held device for separating liquids from solids in a can or similar container. The present invention devices are adapted to receive an open can or container and provide for a mechanism for squeezing liquid out of solids and separating them by straining, manually. The strainer device of the present invention may be made of metal, plastic, or other materials which have sufficient strength to operate in accordance with the description herein, and may be made of combinations of materials. In one preferred embodiment, non-rusting metal is used as the construction material of choice.

Referring to FIGS. 1 and 2, there is shown a side view open position and a side view closed position of a present invention device 1. Upper member 5 includes handle 19 attached to handle end 9. Operating end 11 has a strainer 35 with a strainer frame 37 which is floating at universal hinge member 39. Strainer 35 may be a metal or plastic mesh, perforated plate or other strainer configuration. Lower member 3 has a handle 17 at handle end 7 and an operating end 13 as a can support 25 which has a substantially flat support base 27 and partial sidewalls such as sidewalls 29, 31 and 33.

Upper member 5 and lower member 3 of device 1 are hingedly connected to one another at hinge point 15, which may include a rivet, a screw and nut or other hinging member. Handles 19 and 17 contain a ratchet-locking member 21 and a ratchet-engaging member 23, as; shown. Ratchet-locking member 21 is biased forwardly with spring 41.

As shown in FIG. 2, when an open can of solid food in liquid, i.e., open tuna can 30 is placed in a can support 25 and handles 17 and 19 are brought together, a strainer 35 compresses solids contained in tuna can 30 so that device 1 may be inverted or tilted to drain the liquid. Ratchet-locking member 21 engages with a ratchet-engaging member 23 (FIG. 1) and this holds handles 17 and 19 together. By depressing the top of ratchet-locking member 21 while sliding back, handle 17 is released from handle 19 and compression at operating ends 11 and 13 are released. (In FIGS. 2, 3 and 4, identical parts are identically numbered.)

FIG. 3 shows a top view of upper member 5 and FIG. 4 shows a bottom view of lower member 3.

Obviously, numerous modifications and variations of the present invention are possible in light of the above teachings. It is therefore understood that within the scope of the appended claims, the invention may be practiced otherwise than as specifically described herein.

What is claimed is:

1. A portable, hand-held strainer device for separating liquid from solid of canned food, which comprises:

(a) an upper member and a lower member, each of said upper member and lower member having a handle end and having an operating end, said upper member and lower member being defined relative to each other based on positioning of the operating end of each when in use, said upper member and lower member being pivotally connected to one another in scissor-like fashion;

(b) said lower member having a can support connected to its operating end including a support base having a substantially flat surface which faces the operating end of said upper member;

(c) a floating strainer member connected to said operating end of said upper member, said strainer member being generally circular and adapted to fit inside at least one size of an open can of food and;

(d) a ratchet-locking member located on one of said upper member and said lower member, and a ratchet engaging member located on the other of said upper member and said lower member, said ratchet-locking member having a plurality of ratchets for engaging said ratchet engaging member at different separation levels between said upper member and said lower member handle ends, said ratchet-locking member including a spring for biasing in a locking position and having a trigger for releasing from said locking position to an unlocking position.

2. The device of claim 1 wherein said floating strainer member is a perforated stainless steel plate.

3. The device of claim 1 wherein said floating strainer member is a wire weave strainer with an outer ring.

4. The device of claim 1 wherein said trigger is an automatic locking/press to release button.

5. The device of claim 1 wherein said can support includes at least one side for contacting a side of a can so as to maintain a can in a predetermined position for straining.

6. The device of claim 1 wherein said floating member has a single connection point with said upper member and is balanced in said connection so as to float substantially horizontally.

7. The device of claim 1 wherein each of said handle ends have gripping means.

8. The device of claim 1 wherein said upper member and said lower member are elongated members which have their handle ends substantially parallel to one another and have cross over central portions which are not parallel to one another and cross at their pivotal connection.

9. The device of claim 1 wherein said ratchet engaging member includes an orifice through said handle end and at least one extended protrusion for engagement with said ratchet-locking member.

10. The device of claim 1 wherein said ratchet-locking member and said ratchet engaging member are aligned relative to said handle end so as to permit thumb release of said ratchet-locking member from said ratchet engaging member when in use.

* * * * *